United States Patent
Yoshida et al.

(10) Patent No.: US 8,758,713 B2
(45) Date of Patent: Jun. 24, 2014

(54) METHOD FOR PHOTOOXIDATION OF CARBON MONOXIDE IN GAS PHASE TO CARBON DIOXIDE

(75) Inventors: Gohei Yoshida, Neyagawa (JP); Yuuichi Hayashi, Neyagawa (JP)

(73) Assignee: The Honjo Chemical Corporation, Osaka (JP)

( * ) Notice: Subject to any disclaimer, the term of this patent is extended or adjusted under 35 U.S.C. 154(b) by 181 days.

(21) Appl. No.: 12/451,297

(22) PCT Filed: Apr. 28, 2008

(86) PCT No.: PCT/JP2008/058513
§ 371 (c)(1),
(2), (4) Date: Nov. 5, 2009

(87) PCT Pub. No.: WO2008/136526
PCT Pub. Date: Nov. 13, 2008

(65) Prior Publication Data
US 2010/0119433 A1    May 13, 2010

(30) Foreign Application Priority Data
May 7, 2007  (JP) ................................ 2007-122911

(51) Int. Cl.
*B01D 53/14* (2006.01)
*B01D 53/56* (2006.01)
*C01B 31/18* (2006.01)

(52) U.S. Cl.
USPC ...... 423/246; 423/247; 423/418.2; 423/437.2

(58) Field of Classification Search
None
See application file for complete search history.

(56) References Cited

U.S. PATENT DOCUMENTS

| | | | | |
|---|---|---|---|---|
| 6,080,281 A | * | 6/2000 | Attia | 204/157.3 |
| 6,641,788 B1 | * | 11/2003 | Ogawa et al. | 423/213.2 |
| 6,726,890 B1 | * | 4/2004 | Watanabe | 423/247 |
| 2001/0053414 A1 | * | 12/2001 | Klebanoff et al. | 427/255.6 |
| 2002/0084425 A1 | * | 7/2002 | Klebanoff et al. | 250/492.1 |
| 2004/0175318 A1 | * | 9/2004 | Segawa et al. | 423/247 |
| 2006/0285623 A1 | * | 12/2006 | Miyake et al. | 376/201 |
| 2007/0199302 A1 | * | 8/2007 | Yavuz et al. | 60/274 |
| 2007/0238605 A1 | * | 10/2007 | Strehlau et al. | 502/60 |

FOREIGN PATENT DOCUMENTS

| | | |
|---|---|---|
| JP | 5-111618 | 5/1993 |
| JP | 9-10538 | 1/1997 |
| JP | 10294952 | * 10/1998 |
| JP | 11151776 | * 5/1999 |

(Continued)

OTHER PUBLICATIONS

Ogata, Atsushi et al. "Photoactivation of silica gel with UV light during the reaction of CO with O2". J. Phys. Chem. 5201-5205, 90 (1986).*

(Continued)

*Primary Examiner* — Melvin C Mayes
*Assistant Examiner* — Sheng H Davis
(74) *Attorney, Agent, or Firm* — Wenderoth, Lind & Ponack, L.L.P.

(57) ABSTRACT

The invention provides a method for oxidizing carbon monoxide present in an oxygen-containing gas phase to carbon dioxide which comprises: adsorbing the carbon monoxide onto porous silica; and irradiating the porous silica with ultraviolet ray. In the invention, mesoporous silica or amorphous silica is used as the porous silica. In particular, silica gel that is amorphous silica is preferably used.

4 Claims, 2 Drawing Sheets

(56) References Cited

FOREIGN PATENT DOCUMENTS

| JP | 2002-356310 | | 12/2002 |
|---|---|---|---|
| JP | 2005-238060 | | 9/2005 |
| JP | 2006-167645 | | 6/2006 |
| JP | 20066312150 | * | 11/2006 |
| JP | 2007-500077 | | 1/2007 |
| WO | 2004/108255 | | 12/2004 |

OTHER PUBLICATIONS

Y. Inaki et al., "Photometathesis activity and thermal stability of two types of mesoporous silica materials, FSM-16 and MCM-41", Phys. Chem. Chem. Phys., vol. 2, pp. 5293-5297, 2000.

H. Yoshida et al., "Photoluminescence Spectra Resulting from Hydroxy Groups on Magnesium Oxide supported on Silica", J. Chem. Soc. Faraday Trans, vol. 90, No. 14, pp. 2107-2111, 1994.

H. Yoshida et al., "Alkene Metathesis on Photoirradiated Silica Surface", J. Chem. Soc., Chem. Commun., pp. 761-762, 1995.

T. Kamegawa et al., "Eliminating Traces of Carbon Monoxide Photocatalytically from Hydrogen with a Single-Site, Non-noble Metal Catalyst", The Journal of Physical Chemistry C, American Chemical Society, vol. 111, No. 3, pp. 1076-1078, Jan. 25, 2007.

N. Ichikuni et al., "CO Hikari Sanka Hanno ni Okeru MCM-41 Tannji Mo Shokubai no Kozo Henka" (Structural Change of MCM-41 Supporting Mo (Molybdenum) Catalyst in Co (Carbon Monoxide) Photooxidation, Dai Kai Shokubai Toronkai (90$^{th}$ Conference on Catalysts), Toronkai A Yokoshu (Conference A The Essentials), Catalysis Society of Japan, Sep. 10, 2002, p. 293 (in Japanese).

G. Yoshida et al., "Silica Hikari Shokubai" (Silica Photocatalysts), Convertech, K. K. Kako Gijutsu Kenkyukai, Sep. 15, 2006, vol. 34, No. 9, pp. 118-120 (in Japanese with English abstract).

T. Tanaka et al., "Silica no Hikari Shokubai Sayo" (Photocatalysis by Silica), Journal of the Surface Science Society of Japan, The Surface Science Society of Japan, Feb. 10, 1999, vol. 20, No. 2, pp. 73-78 (in Japanese with English abstract).

Atsushi Ogata et al.; "Reaction Mechanism of Photooxidation of CO on $SiO_2$ and Surface Characteristics Thereof"; The 56$^{th}$ Forum on Catalysts (A)—Abstracts of Lectures; The 51$^{st}$ Annual Autumn Meeting of the Chemical Society of Japan; Kanazawa University; Sep. 1985; p. 286-287.

* cited by examiner

METHOD FOR PHOTOOXIDATION OF CARBON MONOXIDE IN GAS PHASE TO CARBON DIOXIDE

This application is a U.S. national stage of International Application No. PCT/JP2008/058513 filed Apr. 28, 2008.

TECHNICAL FIELD

The present invention relates to a method for photooxidation of carbon monoxide present in a gas phase to carbon dioxide, and in particular, relates to a method for photooxidation of carbon monoxide present at a low concentration in an oxygen-containing gas phase to carbon dioxide.

The method according to the invention is useful, for example, for detoxifying poisonous carbon monoxide generated by incomplete combustion of carbon in air, and is also useful, for example, as a means of selective oxidation of a trace amount of carbon monoxide in a reformed gas containing hydrogen as a main component to carbon dioxide in order to obtain hydrogen fuel suitable for solid polymer electrolyte fuel cells.

BACKGROUND ART

Carbon monoxide generated by incomplete combustion of carbon when using gas appliances or kerosene appliances, or when smoking, is a very highly toxic substance to the human body, as well-known.

There is known a conventional method for removing carbon monoxide in which carbon monoxide is adsorbed onto adsorbents such as zeolite, activated carbon and silica, and removed. A method is also known, as described in Japanese Unexamined Patent Publication No. 5-111618, in which a composite metal oxide (hopcalite) composed of manganese oxide, copper oxide, cobalt oxide and silver oxide is used as a catalyst. A further method is known in which carbon monoxide is adsorbed onto a platinum-group noble metal catalyst such as platinum, iridium, osmium, palladium, rhodium, or ruthenium, and decomposed.

Recently, some catalysts are proposed for removing carbon monoxide in an atmospheric environment. An example of the catalysts is a carbon monoxide decomposition catalyst obtained by heating of proteins containing metals such as iron and copper, as described in Japanese Unexamined Patent Publication No. 2006-167645. A further example is a carbon monoxide photo-decomposition catalyst comprising titanium oxide having cover of tungsten oxide thereon, as described in Japanese Unexamined Patent Publication No. 2007-500077.

Meanwhile, in industrial applications, for example, hydrogen fuel which is obtained from a reformed gas and used for polymer electrolyte fuel cells is required to reduce the concentration of carbon monoxide therein to a level of several to several tens of ppm in order to prevent poisoning of platinum used as an electrode catalyst in the fuel cell. Therefore, hydrocarbons such as natural gas, naphtha and kerosene, or alcohols such as methanol are steam-reformed to manufacture a reformed gas containing hydrogen as a main component, the reformed gas is subjected to carbon monoxide conversion, and then carbon monoxide is oxidized and removed, thereby hydrogen suitably used for fuel is manufactured.

Here, as a catalyst for oxidation of carbon monoxide, for example, ruthenium is known, as described in Japanese Unexamined Patent Publication No. 2002-356310, and adsorbents such as platinum, palladium, or the like are also known for selective adsorption of carbon monoxide contained in a reformed hydrogen gas, as described in Japanese Unexamined Patent Publication No. 9-10538. However, the catalysts and adsorbents including these noble metals are expensive as well as the oxidizing agent for carbon monoxide may react with hydrogen as a main component in a reformed gas to reduce the hydrogen concentration therein.

Meanwhile, crystalline zeolite and activated alumina are conventionally well-known as adsorbents. Among the crystalline zeolite, MS-4A which is industrially in wide use has pores with an average particle diameter of about 0.4 nm, and MS-13X has a uniform pore diameter with an average particle diameter of about 1.0 nm. In contrast, porous activated alumina has pores with an average pore diameter of about 10 nm, a specific surface area of 50 to 400 $m^2/g$ and a pore volume of 0.1 to 1.0 $cm^3/g$.

In recent years, a mesoporous silica which is crystalline porous silica having mesopores with a larger average pore diameter than that of such zeolites, namely, with an average pore diameter of 2 to 50 nm has been synthesized. Noting that the mesoporous silica has such larger mesopores than those of the zeolite, an application as a catalyst support for various catalytic reactions is proposed, as described in, for example, Japanese Unexamined Patent Publication No. 2005-238060. In addition, very recently, an application as a photometathesis catalyst of mesoporous silica by itself is proposed, as described in Phys. Chem. Chem. Phys., 2000, 2, 5293.

Silica gel is also well-known as an adsorbent having pores with an average pore diameter of 1 to 100 nm as well as having a large pore volume. Moreover, because of its chemical stability, silica gel is widely used in various industrial fields, for example, as a moisture-proof material for foods or pharmaceutical products, a dehydrating agent and a purification agent for gas or liquid, as well as a catalyst support.

As described above, the silica gel itself has been widely believed to be chemically inactive, but it is recently reported in J. Chem. Soc., Faraday Trans., 90 (14) 1994, 2107-2111, that amorphous silica having a high specific surface area (500 to 600 $m^2/g$) absorbs ultraviolet ray (240 to 265 nm) and gives a broad emission spectrum around 440 nm, and hence it has photocatalytic function. In fact, photometathesis reactions by using amorphous silica are reported, and at the same time, comparing and discussing other adsorbents such as silica-alumina and alumina, it has been found that they give only a small amount of products from other than the metathesis reaction. Thus, as described in J. Chem. Soc., Chem. Commun., 1995, 761, discussion has been made about differences of such other adsorbents from the amorphous silica which typically gives an olefin metathesis reaction.

The present inventors, in the study for obtaining novel and useful methods for removing carbon monoxide present in oxygen-containing air or a specific gas atmosphere such as a gas atmosphere containing hydrogen or nitrogen as a main component, have carried out intensive studies focusing on the adsorptivity and photocatalytic function of porous silica as described above, and as a result, have found that carbon monoxide present at a low concentration in an oxygen-containing gas phase can be easily and effectively photooxidized to carbon dioxide by using these characteristics of porous silica, and the present invention has been accomplished.

Accordingly, it is an object of the invention to provide a method for photooxidizing carbon monoxide present at a low concentration in an oxygen-containing gas phase to carbon dioxide by using the adsorptivity and photocatalytic function of porous silica.

DISCLOSURE OF THE INVENTION

The invention provides a method for oxidizing carbon monoxide present in an oxygen-containing gas phase to carbon dioxide comprising: adsorbing the carbon monoxide onto porous silica; and irradiating the porous silica with ultraviolet ray.

In the invention, mesoporous silica or amorphous silica is used as the porous silica. Particularly preferably used is silica gel that is amorphous silica.

BEST MODE FOR CARRYING OUT THE INVENTION

Figure 1:
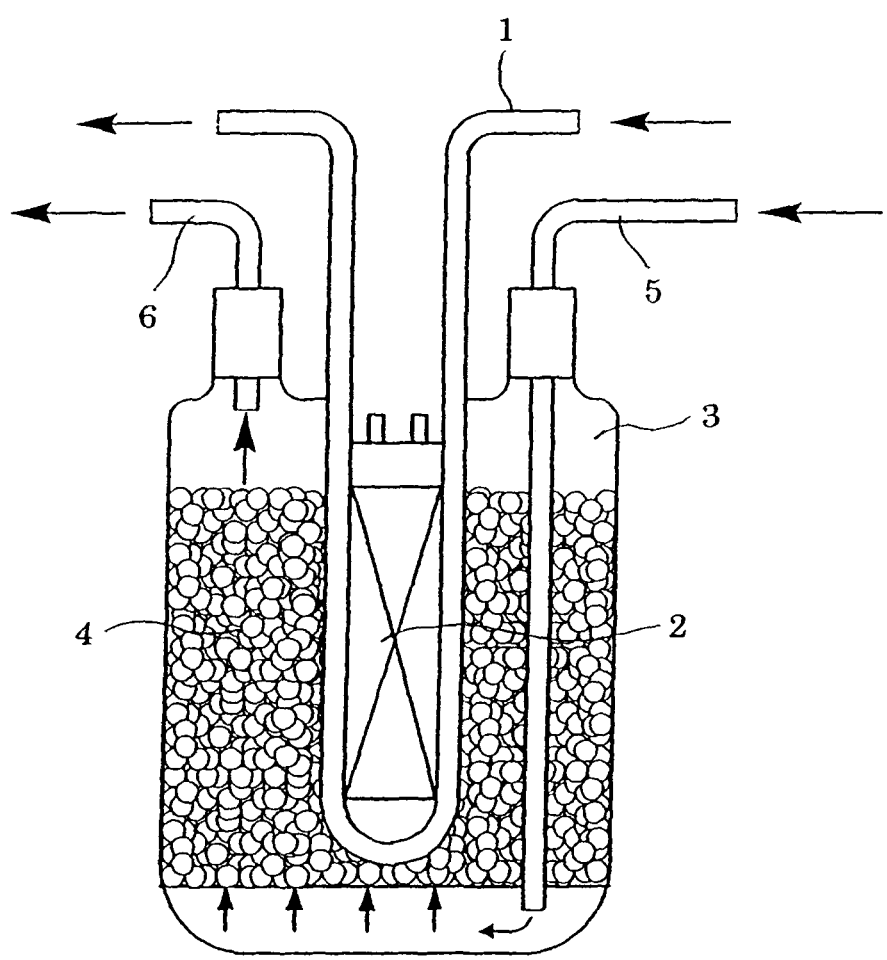
FIG. 1 is a schematic view showing a photoreaction apparatus used in Example 1.

The method for oxidizing carbon monoxide to carbon dioxide according to the invention comprises: adsorbing carbon monoxide present in an oxygen-containing gas phase onto porous silica; and irradiating the porous silica with ultraviolet ray. Usually the method of the invention can be effectively used for oxidizing and removing carbon monoxide present at a low concentration, for example, a range of about 10 to 50,000 ppm and preferably about 10 to 20,000 ppm, in an oxygen-containing gas phase, but the method of the invention is not specifically limited by the concentration of carbon monoxide in the gas phase.

As the oxygen-containing gas phase, air is important from the viewpoint of environment, and on the other hand, a gas which is substantially composed of hydrogen and nitrogen and contains oxygen and carbon monoxide at low concentrations, respectively, is important from the viewpoint of industry, and specifically, a reformed gas used for hydrogen fuel of fuel cells is important. Here, when the oxygen-containing gas phase is hydrogen or nitrogen, the gas may inevitably contain other impurities along with a low concentration of carbon monoxide.

The mesoporous silica used in the method of the invention is not specifically limited, but examples thereof include well-known porous crystalline silica such as FSM-16 (Toyota Central R&D Labs., Inc.), MCM-41 (Mobil Oil) and MSU-H (Mobil Oil). FSM-16 is porous crystalline silica synthesized from a layered silicate compound (clay) as a starting material using a surfactant as a template, and MCM-41 is porous crystalline silica synthesized from an amorphous silica or sodium silicate using a surfactant as a template.

In the invention, among such mesoporous silica, preferably used has a pore diameter in a range of 1 to 50 nm and an almost uniform and regular pore structure including one-dimensional pores. In the cases of FSM-16 and MCM-41, the length of the pore is generally in a range of 10 nm to 1 μm, but in the case of fibrous mesoporous silica, it is not specifically limited. Furthermore, in the invention, the mesoporous silica used may be previously calcined in air at a high temperature or may contain water. Either can adsorb carbon monoxide and be irradiated with ultraviolet ray for photooxidation of carbon monoxide in the same manner.

Similarly, the amorphous silica used in the method of the invention is not specifically limited, and examples thereof include silica gel synthesized from silica sand or obtained by burning and hydrolyzing silicon tetrachloride. The amorphous silica used in the method of the invention does not require surface activation such as evacuation after heating, and for example, a commercial product containing water can be used as it is for the reaction.

However, according to the invention, it is preferred that silica gel has a specific surface area in a range of 200 to 800 $m^2/g$, a pore volume in a range of 0.1 to 5.0 mL/g, and an average pore diameter in a range of 1 to 100 nm, and most preferably in a range of 2 to 50 nm. The average particle diameter of silica gel is not specifically limited, but preferably used has an average particle diameter in a range of 0.5 to 10 mm.

In particular, according to the invention, when silica gel is irradiated with ultraviolet ray to oxidize carbon monoxide, the oxidation rate relates to the average pore diameter of silica gel used. The preferable average pore diameter of silica gel is in a range of 1 to 20 nm because carbon monoxide is oxidized faster when silica gel has pores of such an average pore diameter as mentioned above. Furthermore, silica gel may contain alumina as far as the ratio of $SiO_2/Al_2O_3$ is in a range of 50 or more.

When carbon monoxide in air is oxidized to carbon dioxide according to the invention, carbon monoxide may be adsorbed onto amorphous silica at normal temperature and normal pressure, and the amorphous silica may be irradiated with ultraviolet ray. However, as necessary, carbon monoxide may be adsorbed onto amorphous silica under reduced or increased pressure and/or with heating (generally, with heating up to 100° C.) and the amorphous silica may be irradiated with ultraviolet ray.

In contrast, the photooxidation of carbon monoxide is not observed at all when using porous activated alumina having an average pore diameter similar to that of silica gel (10 nm) or crystalline zeolite having micropores with an average pore diameter of 1 nm or smaller.

According to the method of the invention, carbon monoxide dilutely present in the atmosphere can be detoxified by adsorbing it onto porous silica and irradiating the porous silica with ultraviolet ray thereby efficiently photooxidizing the carbon monoxide to carbon dioxide. Thus, the method of the invention can easily detoxify carbon monoxide in air in a limited space such as a house, hospital, sick room, clean room, vehicle such as an automobile or Shinkansen couch, and ship.

When the method is used for selective oxidation for removing carbon monoxide in a reformed gas used for fuel of fuel cells, carbon monoxide in the reformed gas can be efficiently and selectively removed without using an expensive noble metal catalyst such as platinum or ruthenium.

An example of the composition of reformed gas is hydrogen/carbon monoxide/carbon dioxide=79.2/0.3/20.5 on dry basis (% by volume) or hydrogen/carbon monoxide/carbon dioxide/water=61.7/0.2/16.0/22.1 on wet basis (% by volume) ("2003-2004 Progress Report, Research and Development of Polymer Electrolyte Fuel Cell Systems, Fundamental Research and Development of Polymer Electrolyte Fuel Cell, and Research and Development of Non-Noble Metal Catalysts for Fuel Processor" (May 2005, New Energy and Industrial Technology Development Organization).

In order to oxidize carbon monoxide contained in such a reformed gas to carbon dioxide, a 0.5 to 4.0-fold molar amount of, preferably a 1.0 to 3.5-fold molar amount of oxygen with respect to carbon monoxide is added into the reformed gas, carbon monoxide is adsorbed onto amorphous silica at normal temperature and normal pressure, as necessary, under reduced or increased pressure and/or with heating, and the amorphous silica is irradiated with ultraviolet ray.

Industrial Applicability

According to the invention, carbon monoxide present in an oxygen-containing gas phase can be photooxidized to carbon dioxide by adsorbing the carbon monoxide onto porous silica and then irradiating the porous silica with ultraviolet ray. Thus, according to the invention, for example, a low concentration of carbon monoxide generated by the incomplete combustion of carbon in the atmosphere can be oxidized to carbon dioxide and detoxified. Furthermore, a trace amount of carbon monoxide in a reformed gas containing hydrogen as a main component is selectively oxidized to carbon dioxide in the presence of oxygen to reduce the concentration to a level of several to several tens of ppm so that hydrogen suitable for fuel of various fuel cells including a polymer electrolyte fuel cell can be easily manufactured.

EXAMPLES

The present invention will be explained hereinafter with reference to the following examples, but the invention is not limited to those examples. The average pore diameters of silica gel used below are a value measured by the mercury intrusion method, and the pore diameters of mesoporous silica are a value measured by the small angle X-ray scattering method.

Example 1

The photoreaction apparatus used is shown in FIG. 1. A 300 mL capacity photoreaction container 3 provided with a high pressure mercury lamp 2 having a cooling tube 1 was filled with 120 g of silica gel 4 with an average pore diameter of 10 nm, a specific surface area of 350 m$^2$/g, and a particle diameter of 1.7 to 4.0 mm. As a pretreatment, synthetic air (composed of 21% by volume of oxygen, 79% by volume of nitrogen, with the content of carbon dioxide of 0 ppm) was passed through the reaction container overnight under irradiation of the silica gel in the reaction container with ultraviolet ray and then it was confirmed that the outlet air contained no carbon dioxide desorbed from silica gel.

Then, synthetic air containing 500 ppm of carbon monoxide was fed from a gas inlet tube 5 into the reaction container at a flow rate of 10 mL/min under irradiation of the silica gel in the reaction container with ultraviolet ray, and the gas from an outlet of the reaction container was collected in a Tedlar bag through a gas outlet tube 6 every predetermined time interval.

The amounts of carbon monoxide and carbon dioxide in the gas collected from the outlet of the reaction container described above were measured with time by using Kitagawa Gas Detector Tubes (carbon dioxide: 126SF, 100 to 4,000 ppm, carbon monoxide: 106SH, 1,000 to 20,000 ppm). As a result, the amounts of carbon dioxide in the gas from the outlet of the reaction container were 300 ppm after 1 hour, 400 ppm after 2 hours, and constantly 500 ppm from after 4 hours of the reaction. Even after 24 hours, 500 ppm of carbon dioxide was detected. However, at each of the times, carbon monoxide was not detected at all. Accordingly, it was confirmed that carbon monoxide was completely oxidized into carbon dioxide in the above reaction.

Example 2

The same photoreaction apparatus as in Example 1 was used. The photoreaction container was filled with 120 g of the same silica gel as in Example 1. As a pretreatment, nitrogen gas was passed through the reaction container at a speed of 10 mL/min overnight under irradiation of the silica gel in the reaction container with ultraviolet ray. At this time, carbon dioxide in the gas from the outlet of the reaction container was about 100 ppm.

Then, a mixed gas composed of 0.101% by volume of carbon monoxide, 0.101% by volume of oxygen, and the balance of hydrogen was fed into the photoreaction container at a speed of 10 mL/min under irradiation of the silica gel in the reaction container with ultraviolet ray so that the reaction was carried out. The gas from the outlet of the reaction container was collected in a Tedlar bag every predetermined time interval, and carbon dioxide and carbon monoxide in the gas were measured in the same manner as in Example 1.

As a result, in the gases from the outlet of the reaction container after 1, 3, 6, and 24 hours of the reaction, each amount of carbon monoxide was 500 ppm or lower, but the amounts of carbon dioxide were 500, 700, 750, and 750 ppm, respectively. Thus, it was confirmed that a part of carbon monoxide in the mixed gas was oxidized into carbon dioxide.

Example 3

A mixed gas composed of 0.101% by volume of carbon monoxide, 0.101% by volume of oxygen, and the balance of hydrogen was treated in the same manner as in Example 2 except that silica gel with an average pore diameter of 6 nm was used. As a result, the amount of carbon monoxide in the gas from the outlet of the reaction container was reduced to 500 ppm or lower after 3 hours of the reaction. Furthermore, the amount of carbon dioxide in the gas from the outlet of the reaction container was 200 ppm at the start of the reaction, but after 3 hours of the reaction, the amount of carbon dioxide in the gas from the outlet of the reaction container was increased to 500 ppm. Thus, it was confirmed that carbon monoxide was oxidized to carbon dioxide.

Example 4

Figure 2:
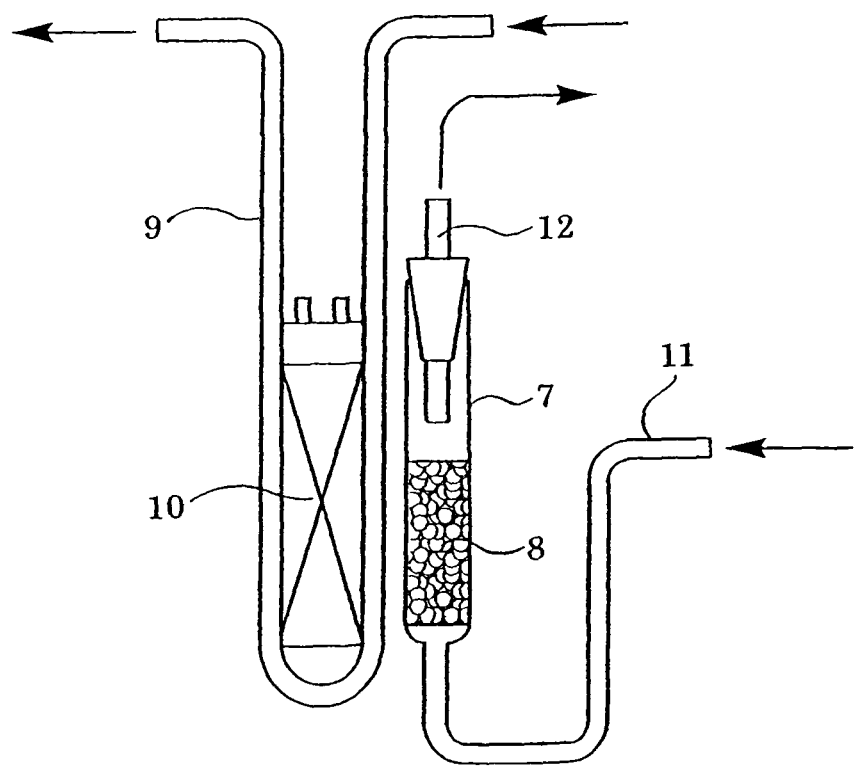
FIG. 2 is a schematic view showing a photoreaction apparatus used in Example 4.

The photoreaction apparatus used is shown in FIG. 2. A glass column 7 with a diameter of 2.0 cm and with a filter was filled with 0.8 g of mesoporous silica (having a pore diameter of 4.0 nm) 8 in the same manner as in Example 1. Dry air was passed through the glass column at a flow rate of 5.0 mL/min overnight under irradiation with ultraviolet ray by using a high pressure mercury lamp 10 equipped with a cooling tube 9, and then it was confirmed that carbon dioxide adsorbed in the mesoporous silica was reduced to 400 ppm. Then, dry air containing 500 ppm of carbon monoxide was fed from a gas inlet tube 11 to the glass column at a flow rate of 5 mL/min so that the reaction was carried out. The gas from a column outlet was collected in a Tedlar bag through a gas outlet tube 12 every predetermined time interval, and the amounts of carbon monoxide and carbon dioxide in the gas from the column outlet were measured in the same manner as in Example 1. As a result, in the gas from the column outlet after 3 hours of the reaction, carbon monoxide was about 300 ppm, whereas carbon dioxide was about 600 ppm.

It was confirmed that mesoporous silica also has the catalyst performance of photooxidation of carbon monoxide to carbon dioxide, although the oxidation ability was inferior to that of silica gel.

Comparative Example 1

The same photoreaction apparatus as in Example 1 was used. The photoreaction container was filled with molecular sieve 13X (of a cylindrical shape having a diameter of 1.6 mm and a length of 2 to 6 mm, and an average pore diameter of 1 nm) as an adsorbent. Then, dry air containing 500 ppm of carbon monoxide (the content of carbon dioxide was 0 ppm) was fed into the photoreaction container at a flow rate of 10 mL/min.

The gas from the outlet of the reaction container was collected in a Tedlar bag every predetermined time interval, and the amounts of carbon monoxide and carbon dioxide in the gas from the outlet of the reaction container were measured in the same manner as in Example 1.

As a result, as the effect of the adsorption of carbon monoxide by the molecular sieve, the amount of carbon monoxide was about 400 ppm in the gas from the outlet of the reaction container even after 24 hours of the reaction, whereas carbon dioxide was not detected even after 24 hours at all.

Comparative Example 2

The same photoreaction apparatus as in Example 2 was used. The glass column was filled with activated alumina (having a specific surface area of 260 m$^2$/g), and dry air was passed through the glass column overnight under irradiation with ultraviolet ray. It was then confirmed that the gas from the column outlet contained no carbon dioxide. Then, dry air containing 500 ppm of carbon monoxide was fed into the column at a flow rate of 10 mL/min.

The gas from the column outlet was collected in a Tedlar bag every predetermined time, and carbon monoxide and carbon dioxide in the gas from the column outlet were measured in the same manner as in Example 1.

As a result, in an early stage, carbon monoxide in the gas from the column outlet was reduced as the effect of the adsorption to activated alumina, but the amount of carbon monoxide after 1 hour was about 500 ppm. However, carbon dioxide was not detected even after 24 hours at all.

The invention claimed is:

1. A method for oxidizing carbon monoxide present in an oxygen-containing gas phase to carbon dioxide which comprises:
    adsorbing the carbon monoxide onto a particle consisting essentially of porous silica selected from the group consisting of mesoporous silica and silica gel, and irradiating the particle with ultraviolet radiation,
    wherein the porous silica has not been surface-activated by evacuating after heating, prior to absorbing the carbon monoxide,
    wherein the oxygen-containing gas phase is selected from the group consisting of air and an oxygen-containing reformed gas for a fuel cell, and
    wherein the carbon monoxide is photocatalyzed to carbon dioxide only by the particle.

2. The method according to claim 1, wherein the mesoporous silica has a pore diameter in a range of 1 to 50 nm.

3. The method according to claim 1, wherein the silica gel has a specific surface area in a range of 200 to 800 m$^2$/g, a pore volume in a range of 0.1 to 5.0 mL/g, and an average pore diameter in a range of 1 to 100 nm.

4. The method according to claim 3, wherein the silica gel has an average particle diameter in a range of 0.5 to 10 mm.

\* \* \* \* \*